Nov. 20, 1951     E. A. ETNYRE     2,575,947
FENCE GATE CONSTRUCTION
Filed April 5, 1949     2 SHEETS—SHEET 1
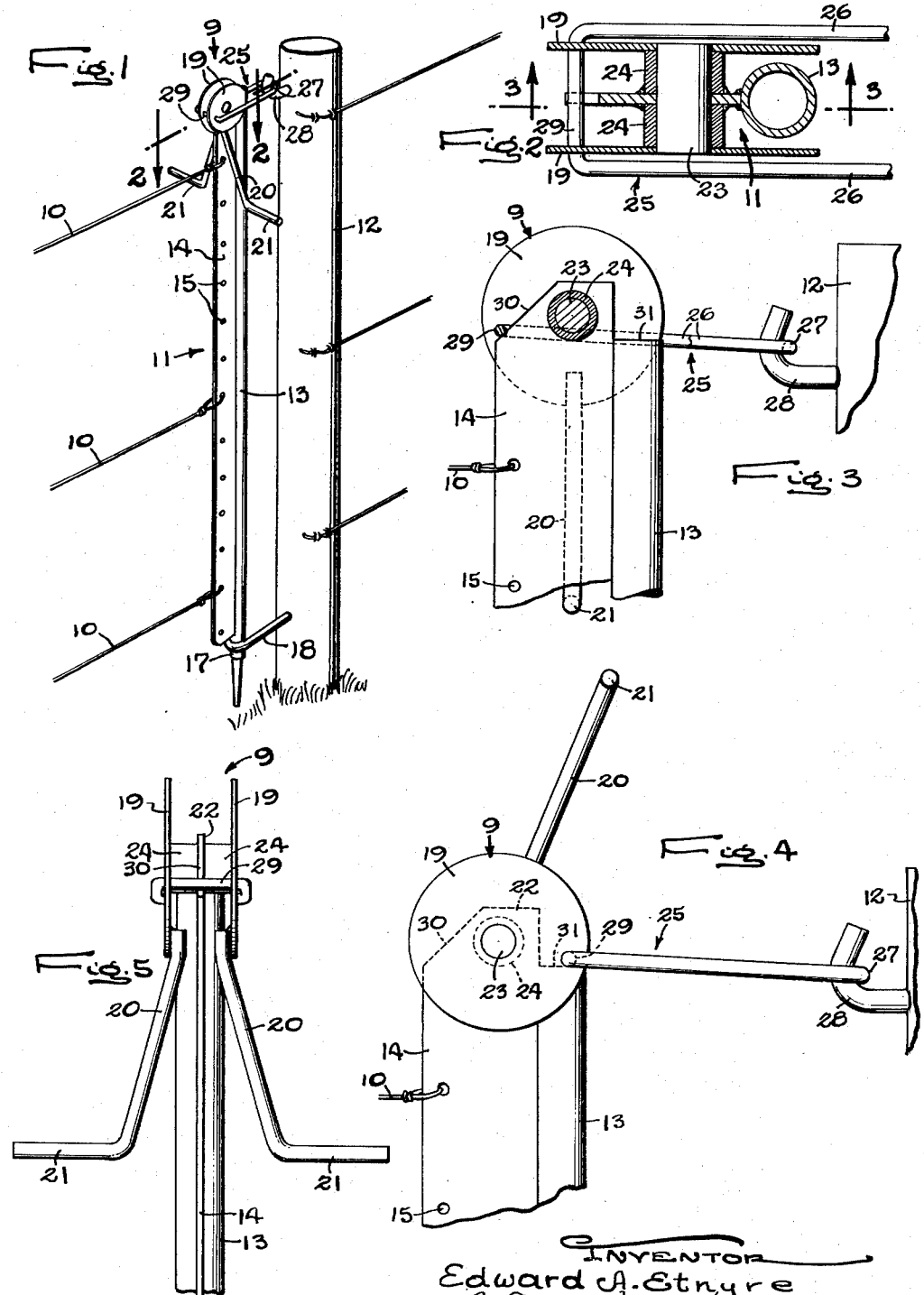
INVENTOR
Edward A. Etnyre
ATTORNEY Nov. 20, 1951 E. A. ETNYRE 2,575,947
FENCE GATE CONSTRUCTION
Filed April 5, 1949 2 SHEETS—SHEET 2
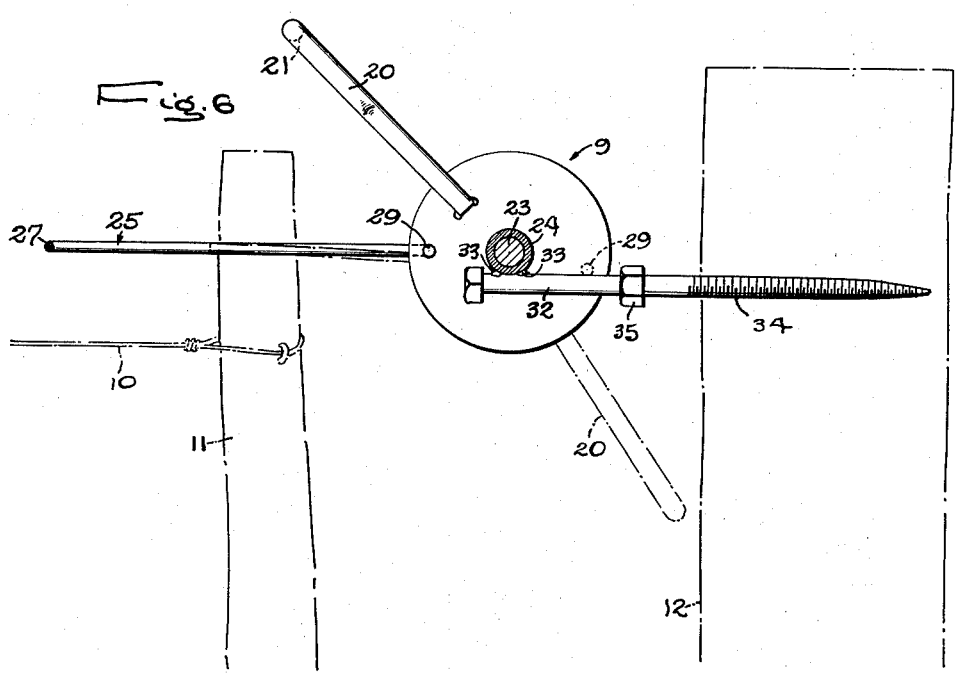
INVENTOR
Edward A. Etnyre
By Carlsen, Pitzner, Hubbard & Wolfe
ATTORNEYS Patented Nov. 20, 1951

2,575,947

UNITED STATES PATENT OFFICE 2,575,947

FENCE GATE CONSTRUCTION

Edward A. Etnyre, Oregon, Ill.

Application April 5, 1949, Serial No. 85,644

2 Claims. (Cl. 292—247)

This invention relates to fence gates of the flexible type in which wires forming the gate proper are attached at spaced points along an upright bar or gatepost manually movable to open or close the gate. To close such a gate, the lower end of the bar is usually inserted in a loop on an adjacent fence post and the upper bar end is swung toward the post manually to tighten the wires after which the upper bar end is held by another loop on the post.

The primary object of the present invention is to provide in a fence gate of the above character a novel lever mechanism which is easy to operate and which enables the gate wires to be drawn tighter than in prior devices.

Another object is to lock the lever mechanism automatically as an incident to movement thereof to tightened position and to utilize the tension of the gate wire to retain this position.

A further object is to provide for convenient actuation of the lever from either side of the fence.

A more detailed object is to utilize the lever tightening mechanism through the intermediary of a link attachable to the fence post and swingable over-center to draw the gate and fence posts toward each other.

Other objects and advantages of the invention will become apparent from the following detailed description taken in connection with the accompanying drawings in which Figure 1 is a fragmentary perspective view of a wire fence having a gate embodying the present invention.

Fig. 2 is a fragmentary sectional view taken along the line 2—2 of Fig. 1.

Fig. 3 is a fragmentary sectional view taken along the line 3—3 of Fig. 2.

Fig. 4 is a view similar to Fig. 3 showing the lever mechanism in a different position.

Fig. 5 is a fragmentary front view looking from the left of Fig. 3.

Fig. 6 is a view similar to Fig. 3 of a modified form of the invention.

The invention is embodied for purposes of illustration in a flexible gate comprising generally a series of vertically spaced parallel wires 10 connected at one end to a fence post (not shown) and at their other ends to a bar or gatepost 11 which may be moved about to open the gate or drawn toward and secured to a rigid fence post 12 to close the gate. In the form shown in Figs. 1 to 5, the bar 11 comprises a rigid tube 13 welded to one edge of a metal reinforcing strip 14 having holes 15 punched therein along the other edge to receive the gate wires 10.

One end of the bar, in this instance the lower end 17, is anchored by inserting this end into a suitable loop fastened to the lower end of the fence post 12. The loop may, as shown, take the form of a hook 18 projecting from and anchored in the post.

The invention contemplates the provision, on the upper end of the gate post 11 (Fig. 1) or on the post 12 (Fig. 6), of a lever 9 swingable substantially in the plane of the gate and detachably connectable to the other post so that in swinging the lever through a substantial arc, the lever acts at a great mechanical advantage to draw the two posts toward each other and thus tension the gate wires tightly. The lever 9 is generally L-shaped having a short arm in the form of a disk 19 fulcrumed on the supporting post and welded to a rod 20. The latter, which constitutes the long arm 20 of the lever, is disposed at somewhat less than a right angle to the other or short arm and, near its end, is bent laterally to form a handle 21 which coacts with the arm 20 to constitute a crank.

To enable the lever to be actuated conveniently from both sides of the gate, the arms 19 and 20 are duplicated and respectively disposed on opposite sides of the extending upper end 22 of the bar 11 when the lever mechanism is mounted on the gate post as shown in Figs. 1 to 5. In this instance, the two disks 19 are welded to opposite ends of a shaft 23 which constitutes the fulcrum of the levers and is journaled in two bushings 24 welded to the bar extension 22 on opposite sides thereof and perpendicular to the plane of the bar. Ample clearance for the actuating arms 20 is achieved by spacing the disks a substantial distance apart and flaring the arms 20 outwardly from their inner ends which, in this instance, are welded to the inner faces of the disks.

The lever mechanism is utilized to draw the gate toward the fence post 12 through the intermediary of a link 25 attachable at one end to the fence post and pivoted at its other end on the lever 9 so as to be swingable over-center with respect to the lever fulcrum 23. In this instance, the link 25 comprises an elongated bail or loop having substantially straight parallel sides 26 which straddle the disks 19 of the lever 9 and a rounded end 27 forming an eye which is adapted to interlock with an upwardly opening hook 28 anchored in the fence post 12 near the upper end thereof. The other end 29 of the link is squared and extends through holes in the disks 19 near the peripheries of the latter and spaced substantially a quarter of a revolution from the long arms 20 of the lever. Thus, the short arm 19 of the lever 9 extends from the link pivot 29 to the lever fulcrum 23 while the long arm 20 of the lever extends from the fulcrum outwardly to the handles 21, the two arms being disposed relative to each other at the acute angle above referred to.

With the link and lever pivotally connected and mounted as described above, the link pivot 29 will, by counterclockwise swinging of the lever handle through substantially a half revolution, be moved from a position (Fig. 4) adjacent the fence post 12 over and across the lever fulcrum 23 to a position on the other side of the bar 11. This motion is arrested when the link has moved slightly over-center or across and below the lever fulcrum 23 as shown in Fig. 3. While this may be accomplished by a stop acting on the lever 9, the stop in this instance is formed by the upper end surface 30 of the bar 11 which surface is positioned to engage the link end or pivot 29 as it reaches the over-center position.

Assuming that the gate constructed as shown in Figs. 1 to 5 is open and is to be closed, the bar 11 is moved bodily to an upstanding position adjacent the fence post 12 (Fig. 1) and the lower bar end 17 is interlocked with the hook 18 on the lower end of the fence post. The handle 21 is then grasped and rotated in a clockwise direction until the link pivot 29 is moved to the side of the bar 11 adjacent the fence post 12. The rounded end 27 of the link 25 is then swung over and interlocked with the upwardly opening hook 28 on the fence post (Fig. 4). The link 25 thus extends outwardly from the bar 11 and the gate wires hang relatively loose. To tighten the gate wires, the handle is grasped again and rotated in a reverse or counterclockwise direction through substantially a half revolution, the link pivot by this motion being carried up and over the fulcrum 23 and down on the other side of the bar. In this motion, the bar 11 is drawn toward the fence post a distance equal to the length of the short lever arm or in other words, approximately the diameter of the disks 19. The gate wires 10 are thus drawn taught and tightly tensioned.

Just after the link has passed over-center or below the level of the fulcrum 23 as shown in Figs. 1 and 3, its motion is arrested by engagement of the pivot 29 and the bar surface 30 in the manner described above. Continued rotation of the link which is urged by the tension of the wires 10 on the bar acting back through the link continues to urge the lever 9 counterclockwise but this is prevented by the stop 30 and the lever is retained in a locked position (Fig. 1).

To open the gate from the closed position in Fig. 1, one handle 21 is grasped and swung in a clockwise direction, thereby raising the link pivot and carrying it back over the fulcrum 23 to the side of the bar adjacent the fence post. In this movement the bar is urged away from the post and the tension on the gate wires is thereby progressively released until the link again extends outwardly from the bar as shown in Fig. 4. With the upper wires 10 thus loosened, the link may be lifted off from the hook 28 after which the lower bar end 17 may be disengaged from the lower hook 18. The gatepost 11 is thereby detached from the fence post 12 and may be moved out of the way to provide the desired opening in the fence.

Instead of mounting the lever 9 on the movable gate post 11, it may be attached to the stationary fence post 12 as shown in Fig. 6, in which case the gate post 11 may, if desired, be made of wood with its upper end small enough to be received in the bail or link 25. To permit of such mounting, the support for the lever may take the form of a rod 32 secured as by a weld 33 to the bushing 24 and projecting tangentially and laterally from the latter well beyond the periphery of the disks 19. The outer end portion of the rod 32 may be formed as a wood screw with a thread 34 so that it may be screwed into the stationary post 12 by means of a wrench applied to a head 35 of the rod. In this instance, the stop for defining the over-center position of the lever 9 is formed by the rod 32 which is engaged by the inner squared end 29 of the link 25 when the arms 20 and this end have reached the positions shown in phantom in Fig. 6.

In the use of this form of the invention, the thread 34 on the outer end portion of the rod 32 is turned into the fence post 12 so as to project laterally therefrom by applying a wrench to the head 35. With the link pivot 29 and the handle 21 swung counterclockwise around the fulcrum 23 to a position away from the fence post 12 as shown in full in Fig. 6, the rounded end portion 27 of the link 25 is swung over the upper end portion of the gate post 11. To draw the gate post 11 toward the fence post 12 to tighten the gate wires, the handle 21 is grasped and swung in a clockwise direction as viewed in Fig. 6, the link pivot 29 by this motion being carried up and over the fulcrum 23 and down on the side of the latter adjacent the fence post 12. When the link pivot has passed over-center or just below the level of the fulcrum 23, its motion is arrested by engagement of the pivot with the rod 32, the lever being retained in this position by the tension of the fence wires.

I claim as my invention:

1. A device for drawing two fence posts together, said device comprising an elongated bar, a sleeve welded to and extending transversely across one end of the bar, a shaft journaled in said sleeve and projecting from opposite ends thereof, two parallel plates welded to opposite ends of said shaft, two generally parallel arms one welded to each of said plates and cooperating therewith to form a lever, said arms projecting radially from said shaft to swing past opposite sides of said bar, an elongated closed loop having an inner end spanning said plates and pivoted on the latter at a point spaced radially from said shaft and angularly from said arms, the outer end portion of the loop being adapted to interengage with a fence post and the intermediate portion straddling said plates and said sleeve in the over-center position of said inner loop end, and a surface on said bar engageable with the inner end of said loop to limit swinging of the arms after the inner loop end has passed over-center.

2. A device for drawing two fence posts together, said device comprising an elongated bar, a sleeve welded to and extending transversely across one end of said bar, a shaft journaled in said sleeve and projecting from opposite ends thereof, two parallel plates welded to opposite ends of said shaft, two substantially parallel arms disposed between said plates and projecting outwardly from said shaft in a radial direction so as to swing past opposite sides of said bar with one arm welded to each plate and cooperating with the same to form a lever, an elongated loop pivoted at its inner end on said plates at a point spaced radially from said shaft and angularly from said arms, the outer end portion of said loop being adapted to interengage with a fence post and the intermediate portion of the loop straddling said plates and said sleeve in the over-center position of the loop, and a surface on said bar interengageable with a surface movable with said plates to limit swinging of the arms after the inner end of said loop has passed over-center.

EDWARD A. ETNYRE.

REFERENCES CITED

The following references are of record in the file of this patent:

UNITED STATES PATENTS

| Number | Name | Date |
|---|---|---|
| 753,175 | Stange | Feb. 23, 1904 |
| 1,035,505 | Williams | Aug. 13, 1912 |
| 1,063,151 | Wiltse | May 27, 1913 |
| 1,458,664 | Schaefer | June 12, 1923 |